US008896415B2

(12) United States Patent
Taraldsen et al.

(10) Patent No.: US 8,896,415 B2
(45) Date of Patent: Nov. 25, 2014

(54) PROGRAMMABLE RADIO

(75) Inventors: Bjorn Tore Taraldsen, Tiller (NO); David Devasahayam Edwin, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 13/985,748

(22) PCT Filed: Feb. 14, 2012

(86) PCT No.: PCT/GB2012/050325
§ 371 (c)(1),
(2), (4) Date: Feb. 4, 2014

(87) PCT Pub. No.: WO2012/110799
PCT Pub. Date: Aug. 23, 2012

(65) Prior Publication Data
US 2014/0159878 A1 Jun. 12, 2014

(30) Foreign Application Priority Data

Feb. 15, 2011 (GB) .................................. 1102628.3

(51) Int. Cl.
*G08B 1/08* (2006.01)
*G06F 11/00* (2006.01)
(Continued)

(52) U.S. Cl.
CPC ................ *G08C 17/02* (2013.01); *G01K 1/024* (2013.01); *G06F 9/544* (2013.01); *H04L* (Continued)

(58) Field of Classification Search
CPC ... G01K 1/024; H04Q 9/00; H04Q 2209/823; H04Q 2209/40
USPC .............. 340/12.5, 3, 539.22, 521, 584, 7.25, 340/7.42; 455/73, 101, 77, 161.1
See application file for complete search history.

(56) References Cited

U.S. PATENT DOCUMENTS 5,517,677 A * 5/1996 Moon ........................ 455/161.1
6,300,871 B1 * 10/2001 Irwin et al. ............... 340/539.28
(Continued)

OTHER PUBLICATIONS

Notification of Transmittal of International Search Report and Written Opinion for PCT/GB2012/050325 mailed Jun. 6, 2012.
(Continued)

*Primary Examiner* — Fekadeselassie Girma
(74) *Attorney, Agent, or Firm* — Koppel, Patrick, Heybl & Philpott

(57) ABSTRACT

A programmable radio communication system comprises a transmitter (1) and a receiver (2). The transmitter comprises radio transmitting means (5) and processing means (3). The processing means is configured to: execute transmitter firmware (6); execute a transmitter software application (4); and operate an interface between the transmitter firmware (6) and the transmitter software application (4), wherein the interface supports one or more operators, each operator acting on one or more elements, wherein the transmitter firmware (6) comprises instructions for: receiving across the interface from the transmitter software application (4), an operator and an element, associated with a virtual pipe; encoding the operator and the element; and using the radio transmitting means (5) to transmit the encoded operator and element by radio, and wherein the receiver (2) comprises radio receiving means (10) and processing means (8), the processing means being configured to: execute receiver firmware (11); execute a receiver software application (9); and operate an interface between the receiver firmware (11) and the receiver software application (9), wherein the receiver firmware (11) comprises instructions for: using the radio receiving means (10) to receive the encoded operator and element; decoding the operator and element; and sending the operator and the element across the interface to the receiver software application (9), thereby creating the virtual pipe between the transmitter software application (4) and the receiver software application (9).

33 Claims, 1 Drawing Sheet

(51) Int. Cl.
- *H04B 1/38* (2006.01)
- *H03C 7/02* (2006.01)
- *G01K 1/02* (2006.01)
- *G06F 9/54* (2006.01)
- *H04L 29/08* (2006.01)
- *G08C 17/02* (2006.01)
- *H04B 1/00* (2006.01)
- *H04W 4/00* (2009.01)
- *H04W 76/02* (2009.01)

(52) U.S. Cl.
CPC ..... *67/125* (2013.01); *H04W 4/001* (2013.01); *H04L 67/12* (2013.01); *H04W 76/021* (2013.01); *H04B 1/0003* (2013.01); *H04L 69/32* (2013.01); *H04W 76/022* (2013.01)
USPC .................. 340/4.32; 340/12.5; 340/539.22; 340/521; 340/584; 702/188; 455/73; 455/101; 455/77; 455/161.1; 370/315

(56) References Cited

U.S. PATENT DOCUMENTS

| | | | |
|---|---|---|---|
| 2002/0009975 A1* | 1/2002 | Janusz et al. ................. 455/73 |
| 2002/0095685 A1 | 7/2002 | Baldus et al. |
| 2005/0113647 A1* | 5/2005 | Lee et al. ..................... 600/300 |
| 2005/0114442 A1 | 5/2005 | Hardwick et al. |
| 2005/0266880 A1 | 12/2005 | Gupta et al. |
| 2006/0145881 A1* | 7/2006 | Sakatani et al. .............. 340/679 |
| 2006/0176842 A1* | 8/2006 | Tamura ........................ 370/315 |
| 2006/0229041 A1* | 10/2006 | Ninomiya et al. ......... 455/196.1 |
| 2007/0207792 A1 | 9/2007 | Loving |
| 2011/0115636 A1 | 5/2011 | Zhang |

OTHER PUBLICATIONS

US Patent Publication No. 2005/266880 A1 (Gupta Vivek), published Dec. 1, 2005.
US Patent Publication No. 2007/207792 A1 (Loving Sean), published Sep. 6, 2007.
US Patent Publication No. 2005/0114442 A1 (Hardwick, et al.), published May 26, 2005.
US Patent Publication No. 2011/0115636 A1 (Zhang), published May 19, 2011.
US Patent Publication No. 2002/0095685 A1 (Baldus, et al.), published Jul. 18, 2002.
UK Combined Search and Examination Report for Application No. GB1202514.4 dated Apr. 10, 2012.
UK Intellectual Property Office, Notification of Grant: Patent Serial No. GB2485922 (Application No. GB1202514.4; Priority GB1102628.3), dated Oct. 9, 2012; & UK Patent GB2485922 dated Nov. 7, 2012.

* cited by examiner

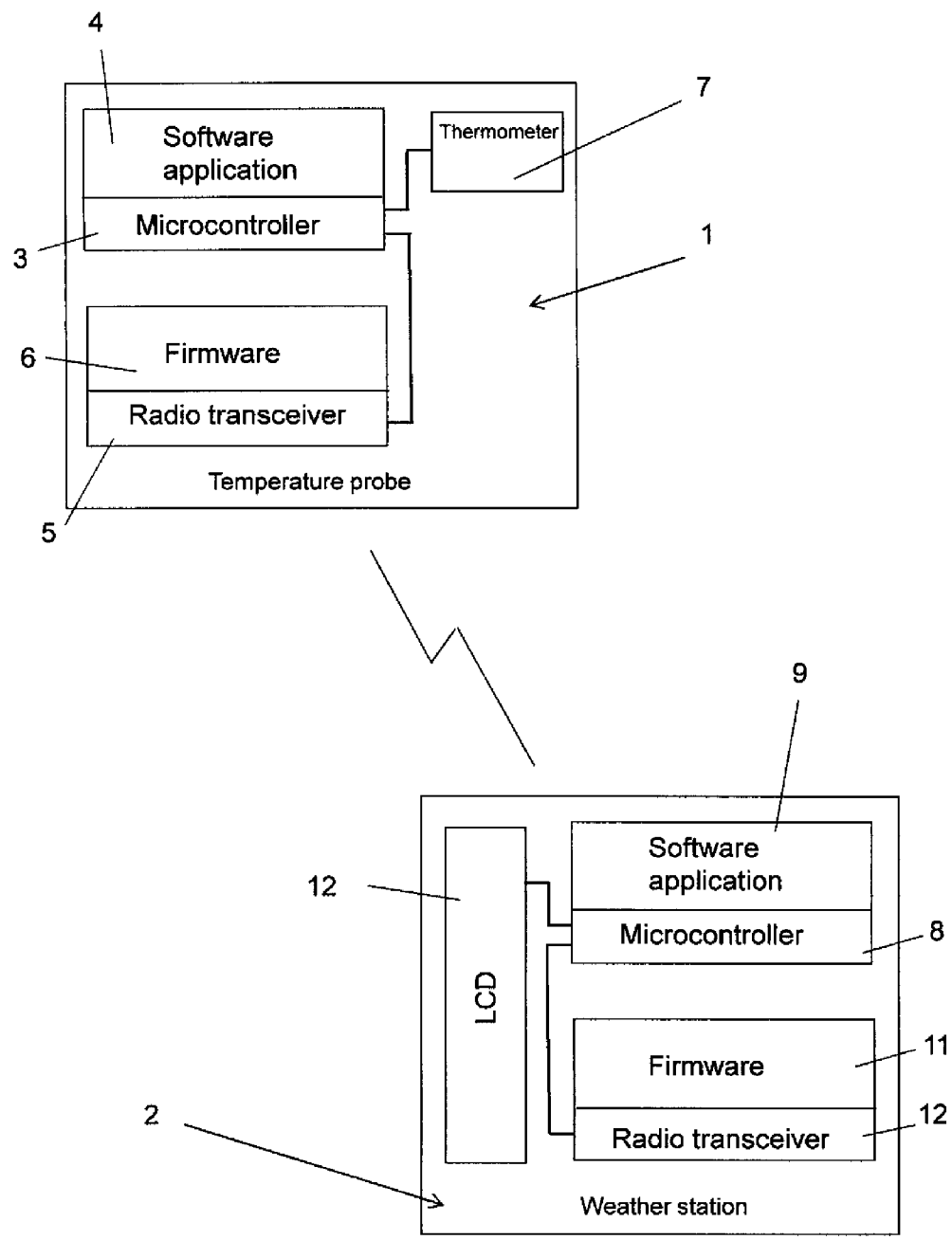

PROGRAMMABLE RADIO

This invention relates to a programmable radio communication system.

Radio transmitters and receivers are known which can be controlled using software. For example, single-chip integrated radio transceivers are known, which can be connected to an external microcontroller (MCU) and controlled by a software application running on the microcontroller. System-on-chip devices are also known, which contain both a radio transceiver and a microcontroller on a single chip.

On a wireless thermometer probe, for example, a software application might periodically obtain readings from a temperature sensor in the probe; determine whether a reading is different from a previous reading; if so, encode the new reading in a data packet; and send the data packet to a radio transmitter component in the probe (e.g. over a serial connection) for transmission to a remote base unit.

A problem with such known radio components is that the software application must construct the data packet. In particular, the developer of the software application must determine how to construct the data packet for transmission; for example, deciding how to include packet-length information, a data-type identifier, and error-detection information, along with the data.

This increases the work required of the MCU in executing the software application and, perhaps more importantly, puts a considerable burden on the software developer. In particular, it is necessary for the receiving radio-equipped appliance to know how to decode the packet, and to do so in a way that precisely corresponds to the transmit-side encoding schema. The software developer(s) must ensure, for example, that the interpretation of the data-type identifiers is consistent on both appliances. Without extreme care being taken, it is likely that errors by the application software developer(s) will lead to incompatibilities between the transmit-side software application and the receive-side software application.

The present invention seeks to mitigate these problems.

From one aspect, the invention provides a programmable radio communication system comprising a transmitter and a receiver, wherein the transmitter comprises radio transmitting means and processing means, the processing means being configured to:
   execute transmitter firmware;
   execute a transmitter software application; and
   operate an interface between the transmitter firmware and the transmitter software application, wherein the interface supports one or more operators, each operator acting on one or more elements,
wherein the transmitter firmware comprises instructions for:
   receiving across the interface from the transmitter software application, an operator and an element, associated with a virtual pipe;
   encoding the operator and the element; and
   using the radio transmitting means to transmit the encoded operator and element by radio, and
wherein the receiver comprises radio receiving means and processing means, the processing means being configured to:
   execute receiver firmware;
   execute a receiver software application; and
   operate an interface between the receiver firmware and the receiver software application,
wherein the receiver firmware comprises instructions for:
   using the radio receiving means to receive the encoded operator and element;
   decoding the operator and element; and
   sending the operator and the element across the interface to the receiver software application, thereby creating the virtual pipe between the transmitter software application and the receiver software application.

Thus, it will be appreciated by those skilled in the art that the transmit-side and receive-side software applications do not need to be responsible for constructing and deconstructing data packets directly, but instead interface with the radio via operators and elements. The firmware interface can provide operators and elements that are specific to a particular application field.

For example, where the transmitter is contained in a wireless temperature probe and the receiver is contained in a weather station, an element of the transmit-side and receive-side interfaces might be "displayed temperature" and an operator might be "SET".

The operator and element may be encoded in any suitable manner. In some embodiments, however, they are encoded by an identifier. An identifier may take any suitable form, but in some embodiments it is a number. The identifier may be a pipe identifier, associated with a virtual pipe. The transmit-side firmware may therefore comprise instructions for determining a pipe identifier associated with the operator and/or the element. Similarly the receive-side firmware may comprise instructions for determining an operator and/or element associated with a received pipe identifier.

The complexity of maintaining consistent data-type identifier databases, packet structure information, etc., between the transmitting appliance and the receiving appliance, as in known arrangements, is removed from the developer(s) of the transmit-side and receive-side software applications.

Rather, the mapping with pipe identifiers can be determined by the author of the transmitter and receiver firmware.

The transmitter and receiver firmware could be written by a manufacturer or vendor of the radio transmitting means and radio receiving means.

The use of the term firmware, however, is not intended to limit the nature of the software in any way. For example, the firmware may be a further software application, or it may be a part of the transmit-side or receive-side software applications themselves (e.g. the transmit-side interface may be internal to the transmit-side software application). The firmware may be the lowest level of software, e.g. it may comprise instructions for interfacing directly with the radio hardware, but this is not essential, and the firmware may interface with additional software in order to use the radio transmitting means to transmit data by radio, or to use the radio receiving means to receive data.

The invention extends to a method of operating a programmable radio communication system having:
   a transmitter comprising transmitting means and processing means; and
   a receiver comprising radio receiving means and processing means, the method comprising the transmitter:
   executing transmitter firmware on the transmitter processing means;
   executing a transmitter software application on the transmitter processing means;
   operating an interface between the transmitter firmware and the transmitter software application, wherein the interface supports one or more operators, each operator acting on one or more elements;
   passing across the interface from the transmitter software application to the transmitter firmware, an operator and an element associated with a virtual pipe;
   using the transmitter firmware to encode the operator and the element; and
   using the radio transmitting means to transmit the encoded operator and element by radio, the method further comprising the receiver:
executing receiver firmware on the receiver processing means;
execute a receiver software application on the receiver processing means;
operating an interface between the receiver firmware and the receiver software application;
using the radio receiving means to receive the encoded operator and element;
using the receiver firmware to decode the operator and element; and
passing the operator and the element across the interface from the receiver firmware to the receiver software application, thereby creating the virtual pipe between the transmitter software application and the receiver software application.

The invention further extends to a transmitter for a programmable radio communication system, wherein the transmitter comprises radio transmitting means and processing means, the processing means being configured to:
execute transmitter firmware;
execute a transmitter software application; and
operate an interface between the transmitter firmware and the transmitter software application, wherein the interface supports one or more operators, each operator acting on one or more elements, and
wherein the transmitter firmware comprises instructions for:
receiving across the interface from the transmitter software application, an operator and an element, associated with a virtual pipe;
encoding the operator and the element; and
using the radio transmitting means to transmit the encoded operator and element by radio.

The invention also extends to a receiver for a programmable radio communication system, wherein the receiver comprises radio receiving means and processing means, the processing means being configured to
execute receiver firmware;
execute a receiver software application; and
operate an interface between the receiver firmware and the receiver software application, and
wherein the receiver firmware comprises instructions for:
using the radio receiving means to receive an encoded operator and element;
decoding the operator and element; and
sending the operator and the element across the interface to the receiver software application, thereby creating a virtual pipe between the transmitter software application and the receiver software application.

From a further aspect, the invention provides a software tool for generating firmware for a programmable radio communication apparatus comprising radio transmitting or receiving means and processing means, the software tool comprising instructions for:
receiving a definition of an interface which supports one or more operators acting on one or more elements, and
generating firmware suitable for execution on the processing means alongside a software application such that the firmware provides said interface, the firmware comprising instructions (a) for receiving across the interface from the software application an operator and an element, associated with a virtual pipe, for encoding the operator and the element, and for using the radio transmitting means to transmit the encoded operator and element by radio; or (b) for using the radio receiving means to receive an encoded operator and element, for decoding the operator and element, and for sending the operator and the element across the interface to the software application.

From a still further aspect, the invention provides firmware for a programmable radio communication apparatus comprising radio transmitting or receiving means and processing means, wherein the firmware is suitable for execution on the processing means alongside a software application such that the firmware provides an interface which supports one or more operators acting on one or more elements, the firmware comprising instructions (a) for receiving across the interface from the software application an operator and an element, associated with a virtual pipe, for encoding the operator and the element, and for using the radio transmitting means to transmit the encoded operator and element by radio; or (b) for using the radio receiving means to receive an encoded operator and element, for decoding the operator and element, and for sending the operator and the element across the interface to the software application.

The transmitter firmware may additionally comprise instructions for receiving a value across the interface from the transmitter software application and for using the radio transmitting means to transmit the value. The receiver firmware may comprise instructions for using the radio receiving means to receive the value and for sending the value across the interface to the receiver software application.

For example, the software application in a temperature probe might determine that the displayed temperature on the remote weather station should be updated to 21 degrees. It would therefore send the operator "set", the element "displayed temperature" and the value "21" across the interface to the transmitter firmware. The software application in the weather station would subsequently receive the operator "set", the element "displayed temperature" and the value "21" across its interface with the receiver firmware. Neither software application need be aware of the implementation details of how the data are wirelessly transmitted.

The combination of "set" and "displayed temperature" might, for example, be mapped to the pipe identifier "7". However, the developer(s) of the software applications need not concern themselves with this.

In some embodiments, however, the software application comprises the firmware such that the software application itself determines a pipe identifier associated with the operator and element. It may then pass this pipe identifier, and optionally additional data, to the radio transmitting means.

The processing means in the transmitter may be a single processor, such as a microcontroller unit or central processing unit. Alternatively, it may comprise two processors, one executing the transmitter firmware and another executing the transmitter software application. Similarly the processing means in the receiver may be a single processor or may comprise two processors.

In one set of embodiments, the transmitter comprises a radio transmitter chip and a separate microcontroller. The transmitter firmware is preferably executed on a processor on the radio transmitter chip, while the transmitter software application may be executed on the separate microcontroller. However, the transmitter firmware and the transmitter software application may both be executed on the separate microcontroller.

Similarly, in some embodiments, the receiver comprises a radio receiver chip and a separate microcontroller. The receiver firmware is preferably executed on a processor on the radio receiver chip, while the receiver software application may be executed on the separate microcontroller. However, the receiver firmware and the receiver software application may both be executed on the separate microcontroller.

In other embodiments, the transmitter firmware and the transmitter software application are both executed on a processor on a radio transmitter chip. Similarly, in some embodiments, the receiver firmware and the receiver software application are both executed on a processor on a radio receiver chip.

The transmitter may be contained in a device that also contains a radio receiver, which may be a receiver embodying the invention. Similarly the receiver may be contained in a device that also contains a radio transmitter, which may be a transmitter embodying the invention.

For a device comprising a transmitter embodying the invention and a receiver embodying the invention, the respective processing means of the transmitter and receiver may be partially or completely shared between the transmitter and receiver. The transmitter and receiver firmware may be the same firmware (e.g. a single executable programme). The transmitter and receiver software applications may be the same software application (e.g. a single executable programme). The interface between the transmitter firmware and the transmitter software application may be integrated with the interface between the receiver firmware and the receiver software application.

In particular, one or more operators (e.g. a "GET" operator), optionally in combination with one or more particular elements, may have associated return values. The radio receiving means may therefore be configured to receive information relating to a return value associated with an operator.

For example, the software application running on a wireless temperature probe may determine the rate at which it should update the displayed temperature on a remote weather station by invoking operator "GET" on the element "update rate" defined by the probe's firmware interface. The interface may indicate that a byte value will be returned. The radio transmitter in the wireless temperature probe sends a pipe identifier associated with "GET" and "update rate" to the radio receiver on the remote wireless weather station. The "GET" operator and the "update rate" element are passed to the weather station's software application, which responds by sending a return value (e.g. "5") across the interface to the weather station's firmware. This is then communicated by radio (optionally using a specific return-value pipe identifier) to the wireless temperature probe, which passes the return value from the probe's firmware across the interface to the probe's software application.

Some operators may affect how the radio transmitting means or radio receiving means operates; e.g. by invoking particular firmware behaviour. For example, an operator may cause the radio to receive 3 packets in succession, before passing the concatenated data to the software application. In another example, an operator may cause the radio transmitter to request an acknowledgement from the remote radio, and/or to retransmit data automatically if an acknowledgement is not received.

The firmware could be stored in read-only memory on the radio transmitter or receiver, such as ROM. Alternatively it may be stored in writable-memory such as EEPROM, Flash or RAM and can therefore be loaded onto the transmitter or receiver after manufacture of the hardware.

Optional or preferred features of any of the aspects of the invention may be optional or preferred features of any of the other aspect, wherever appropriate.

Certain preferred embodiments of the invention will now be described, by way of example only, with reference to the accompanying drawings, in which:

FIG. 1 is schematic diagram of a wireless temperature probe and a weather station comprising communication apparatus embodying the invention.

FIG. 1 shows a wireless temperature probe 1 and a remote weather station 2.

The temperature probe 1 contains a microcontroller (MCU) 3 running a temperature-probe software application 4. The MCU 3 is connected to a single-chip radio transceiver 5 running firmware 6. The MCU 3 is also connected to a thermometer 7. These connections may be of any suitable type; e.g. Serial Peripheral Interface (SPI) connections.

The weather station 2 contains a microcontroller (MCU) 8 running a weather-station software application 9. The MCU 8 is connected to a single-chip radio transceiver 10 running firmware 11. The MCU 8 is also connected to an LCD display module 12.

The temperature-probe software application 4 may cause the MCU to obtain temperature readings at intervals from the thermometer 7. If it determines that the temperature has changed, the software application 4 invokes the "SET" operator on the element "displayed temperature" with a value of the current temperature, e.g. "21", on an interface provided by the firmware 6. This causes the single-chip radio transceiver 5 to determine a pipe identifier associated with the operator and element combination from a look-up table.

The single-chip radio transceiver 5 then transmits the pipe identifier and the value "21" to the single-chip radio transceiver 10 in the weather station 2.

The firmware 11 in the weather station 2 may respond with an acknowledgement signal to the temperature probe 1. This acknowledgement process can happen without any involvement by the software applications 4, 9 on either device.

The firmware 11 in the weather station 2 uses a look-up table to determine an operator and element associated with the received pipe identifier. In this example, the operator and element are the same as those invoked by the temperature-probe software application 4; i.e. "SET" and "displayed temperature".

The weather-station firmware 11 creates an event which is passes across an interface to the weather-station software application 9, corresponding to the "SET" operator, the "displayed temperature" element, and the value "21". The software application 9 causes the MCU 8 on the weather station 2 to update the LCD display 12 with the correct temperature.

The invention claimed is:

1. A programmable radio communication system comprising a transmitter section and a receiver section,
wherein the transmitter section comprises a radio transmitter and a processor, the processor being configured to:
execute transmitter firmware;
execute a transmitter software application; and
operate an interface between the transmitter firmware and the transmitter software application, wherein the interface supports one or more operators, each operator acting on one or more elements,
wherein the transmitter firmware comprises instructions for:
receiving across the interface from the transmitter software application, an operator and an element, associated with a virtual pipe;
encoding the operator and the element;
constructing a data packet; and
using the radio transmitter to transmit the radio packet including the encoded operator and element by radio, and
wherein the receiver section comprises a radio receiver and a processor, the processor being configured to:
execute receiver firmware;
execute a receiver software application; and
operate an interface between the receiver firmware and the receiver software application, wherein the receiver firmware comprises instructions for:
using the radio receiver to receive the data packet including the encoded operator and element;
deconstructing the data packet;
decoding the operator and element; and
sending the operator and the element across the interface to the receiver software application, thereby creating the virtual pipe between the transmitter software application and the receiver software application,
wherein the receive-side firmware is configured to use a lookup table to determine said operator and element from a received pipe identifier.

2. A programmable radio communication system as claimed in claim 1 wherein the transmit-side firmware comprises instructions for determining a pipe identifier associated with the operator or the element.

3. A programmable radio communication system as claimed in claim 1 wherein the transmitter firmware additionally comprises instructions for receiving a value across the interface from the transmitter software application and for using the radio transmitter to transmit the value.

4. A programmable radio communication system as claimed in claim 1 wherein the receiver firmware comprises instructions for using the radio receiving means to receive the value and for sending the value across the interface to the receiver software application.

5. A programmable radio communication system as claimed in claim 1 wherein the transmitter comprises a radio transmitter chip and a separate microcontroller.

6. A programmable radio communication system as claimed in claim 1 wherein the transmitter comprises a radio transmitter chip and the transmitter firmware is executed on a processor on the radio transmitter chip.

7. A programmable radio communication system as claimed in claim 1 wherein the receiver comprises a radio receiver chip and the receiver firmware is executed on a processor on the radio receiver chip.

8. A programmable radio communication system as claimed in claim 1 wherein the transmitter firmware and the transmitter software application are both executed on a processor on a radio transmitter chip.

9. A programmable radio communication system as claimed in claim 1 wherein the receiver firmware and the receiver software application are both executed on a processor on a radio receiver chip.

10. A transmitter section for a programmable radio communication system, wherein the transmitter section comprises a radio transmitter and a processor, the processor being configured to:
execute transmitter firmware;
execute a transmitter software application; and
operate an interface between the transmitter firmware and the transmitter software application, wherein the interface supports one or more operators, each operator acting on one or more elements, and
wherein the transmitter firmware comprises instructions for:
receiving across the interface from the transmitter software application, an operator and an element, associated with a virtual pipe between the transmitter software application and a receiver software application;
encoding the operator and the element;
constructing a data packet; and
using the radio transmitter to transmit the radio packet including the encoded operator and element by radio.

11. A transmitter section as claimed in claim 10 wherein the operator and element are encoded by an identifier.

12. A transmitter section as claimed in claim 11 wherein said identifier is a number.

13. A transmitter section as claimed in claim 11 wherein the transmitter firmware comprises instructions for determining a pipe identifier associated with the operator and/or the element.

14. A transmitter section as claimed in claim 10 wherein the transmitter firmware additionally comprises instructions for receiving a value across the interface from the transmitter software application and for using the radio transmitter to transmit the value.

15. A transmitter section as claimed in claim 10 comprising a radio transmitter chip and a separate microcontroller.

16. A transmitter section as claimed in claim 10 wherein the transmitter firmware is executed on a processor on the radio transmitter chip.

17. A transmitter section as claimed in claim 10 wherein the transmitter firmware and the transmitter software application are both executed on a processor on a radio transmitter chip.

18. A receiver section for a programmable radio communication system, wherein the receiver section comprises radio receiver and a processor, the processor being configured to
execute receiver firmware;
execute a receiver software application; and
operate an interface between the receiver firmware and the receiver software application, and
wherein the receiver firmware comprises instructions for:
using the radio receiver to receive a data packet including an encoded operator and element;
deconstructing the data packet;
decoding the operator and element; and
sending the operator and the element across the interface to the receiver software application, thereby creating a virtual pipe between a transmitter software application and the receiver software application;
wherein the receiver firmware is configured to use a lookup table to determine said operator and element from a received pipe identifier.

19. A receiver as claimed in claim 18 wherein the receiver firmware comprises instructions for using the radio receiver to receive the value and for sending the value across the interface to the receiver software application.

20. A receiver as claimed in claim 18 wherein the receiver firmware is executed on a processor on the radio receiver chip.

21. A receiver as claimed in claim 18 wherein the receiver firmware and the receiver software application are both executed on a processor on a radio receiver chip.

22. A device comprising a radio transmitter and a receiver as claimed in claim 18.

23. A device comprising a transmitter section as claimed in claim 10 and a receiver section.

24. A device as claimed in claim 23 wherein said receiver section is as claimed in claim 18.

25. A device as claimed in claim 24 wherein the respective processing means of the transmitter and receiver are partially or completely shared between the transmitter and receiver.

26. A device as claimed in claim 24 wherein the transmitter and receiver firmware are provided by a single executable programme.

27. A device as claimed in claim 24 wherein the transmitter and receiver software applications are provided by a single executable programme.

28. A device as claimed in claim 24 wherein the interface between the transmitter firmware and the transmitter software application is integrated with the interface between the receiver firmware and the receiver software application.

29. A device as claimed in claim 24 wherein the radio receiver is configured to receive information relating to a return value associated with an operator.

30. A method of operating a programmable radio communication system having:
- a transmitter section comprising a transmitter and a processor; and
- a receiver section comprising a radio receiver and a processor, the method comprising the transmitter section:
- executing transmitter firmware on the transmitter section processor;
- executing a transmitter software application on the transmitter section processor;
- operating an interface between transmitter firmware and the transmitter software application, wherein the interface supports one or more operators, each operator acting on one or more elements;
- passing across the interface from the transmitter software application to the transmitter firmware, an operator and an element associated with a virtual pipe;
- using the transmitter firmware to encode the operator and the element;
- constructing a data packet; and
- using the radio transmitter to transmit the encoded operator and element by radio, the method further comprising the receiver section:
- executing receiver firmware on the receiver section processor;
- execute a receiver software application on the receiver section processor;
- operating an interface between the receiver firmware and the receiver software application;
- using the radio receiver to receive the encoded operator and element;
- using the receiver firmware to deconstruct the data packet and decode the operator and element; and
- passing the operator and the element across the interface from the receiver firmware to the receiver software application, thereby creating the virtual pipe between the transmitter software application and the receiver software application wherein the receiver firmware is configured to use a lookup table to determine said operator and element from a received pipe identifier.

31. A programmable radio communication system, comprising a receiver section wherein the receiver section comprises a radio receiver and a processor, the processor being configured to
- execute receiver firmware;
- execute a receiver software application; and
- operate an interface between the receiver firmware and the receiver software application, and wherein the receiver firmware comprises instructions for:
- using the radio receiver to receive a data packet including an encoded operator and element;
- deconstructing the data packet;
- decoding the operator and element; and
- sending the operator and the element across the interface to the receiver software application, thereby creating a virtual pipe between the transmitter software application and the receiver software application wherein the receiver firmware is configured to use a lookup table to determine said operator and element from a received pipe identifier.

32. A non-transitory computer-readable medium comprising instructions for generating firmware for a programmable radio communication apparatus comprising a radio transmitter or a radio receiver and a processor, said instructions comprising instructions for:
- receiving a definition of an interface which supports one or more operators acting on one or more elements, and
- generating firmware suitable for execution on the processor alongside a software application such that the firmware provides said interface, the firmware comprising instructions (a) for receiving across the interface from the software application an operator and an element, associated with a virtual pipe, for encoding the operator and the element, for constructing a data packet; and for using the radio transmitter to transmit the encoded operator and element by radio; or (b) for using the radio receiver receiving means to receive an encoded operator and element, for deconstructing the data packet, for decoding the operator and element, and for sending the operator and the element across the interface to the software application wherein the firmware is configured to use a lookup table to determine said operator and element from a received pipe identifier.

33. A non-transitory computer readable medium comprising instructions for operating a programmable radio communication apparatus comprising a radio transmitter or a radio receiver and a processor, wherein the instructions comprise firmware suitable for execution on the processor alongside a software application such that the firmware provides an interface which supports one or more operators acting on one or more elements, the firmware comprising instructions (a) for receiving across the interface from the software application an operator and an element, associated with a virtual pipe between a transmitter software application and a receiver software application, for encoding the operator and the element, for constructing a data packet and for using the radio transmitter to transmit the encoded operator and element by radio; or (b) for using the radio receiver to receive an encoded operator and element, for deconstructing the data packet, for decoding the operator and element, and for sending the operator and the element across the interface to the software application wherein the firmware is configured to use a lookup table to determine said operator and element from a received pipe identifier.

* * * * *